United States Patent [19]

Voldman et al.

[11] Patent Number: 5,777,829
[45] Date of Patent: Jul. 7, 1998

[54] METHOD AND APPARATUS FOR PROVIDING ELECTROSTATIC DISCHARGE PROTECTION FOR AN INDUCTIVE COIL OF A MAGNETIC TRANSDUCER

[75] Inventors: Steven H. Voldman, South Burlington, Vt.; Albert J. Wallash, Morgan Hill, Calif.

[73] Assignee: International Business Machines Corporation, Armonk, N.Y.

[21] Appl. No.: 728,297

[22] Filed: Oct. 8, 1996

[51] Int. Cl.⁶ .................. G11B 5/10; G11B 5/17
[52] U.S. Cl. .......................... 360/128; 360/123
[58] Field of Search ..................... 360/103, 123, 360/126, 128

[56] References Cited

U.S. PATENT DOCUMENTS

| | | |
|---|---|---|
| 3,975,771 | 8/1976 | Lazzari . |
| 4,305,115 | 12/1981 | Armitage . |
| 4,317,149 | 2/1982 | Elser et al. . |
| 4,800,454 | 1/1989 | Schwarz et al. . |
| 4,841,395 | 6/1989 | Craft . |
| 4,945,434 | 7/1990 | Wilmer et al. . |
| 4,958,255 | 9/1990 | Pritchard . |
| 4,987,514 | 1/1991 | Gailbreath et al. . |
| 5,142,425 | 8/1992 | Gailbreath, Jr. et al. . |
| 5,315,472 | 5/1994 | Fong et al. . |
| 5,491,605 | 2/1996 | Hughbanks ............... 369/113 |
| 5,539,598 | 7/1996 | Denison .................. 360/113 |
| 5,566,038 | 10/1996 | Keel ...................... 360/103 |
| 5,587,857 | 12/1996 | Voldman .................. 360/103 |
| 5,638,237 | 6/1997 | Phipps ................... 360/128 |

FOREIGN PATENT DOCUMENTS

| | | |
|---|---|---|
| 43 10233 A1 | 10/1994 | Germany . |
| 5-46939 | 2/1993 | Japan . |

*Primary Examiner*—A. J. Heinz
*Attorney, Agent, or Firm*—Merchant, Gould, Smith, Edell, Welter & Schmidt, P.A.

[57] ABSTRACT

Electrostatic discharge protection for an inductive coil in a magnetic head of a disk drive. Structures are provided to dissipate electrostatic charges which may arise between the leads of the inductive coil or between the inductive coil and one of the pole pieces in a magnetic head. An electrostatic discharge element is coupled to the inductive coil for dissipating electrostatic charge from the inductive coil. The electrostatic discharge element may include a spark gap, a diode circuit, a MOSFET, a silicon controlled rectifier or a bleed transistor circuit. The electrostatic discharge element may include a first electrostatic discharge element coupled between the first turn of the inductive coil and the magnetic yoke and a second electrostatic discharge element coupled between the magnetic yoke and the last turn of the inductive coil. The magnetic yoke or pole piece may include an upper and a lower magnetic pole with mirrored protection circuits provided for each pole.

35 Claims, 5 Drawing Sheets

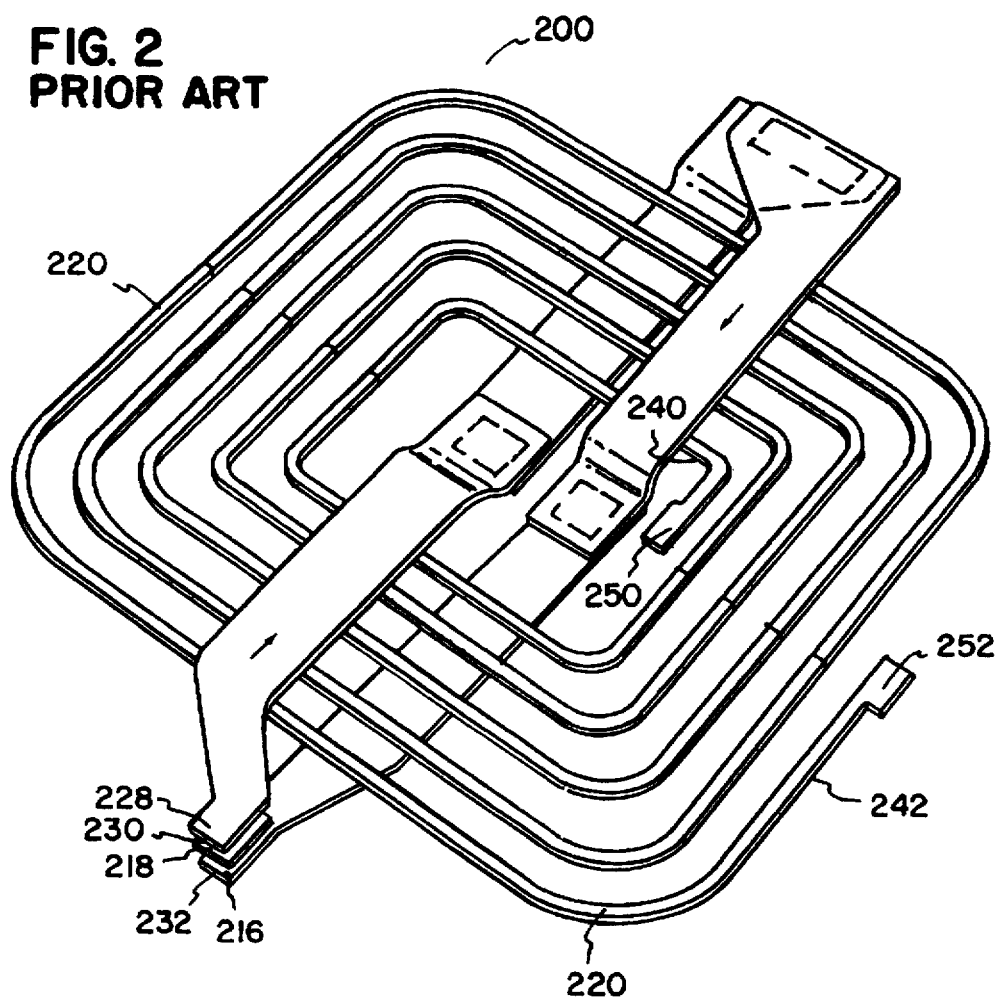
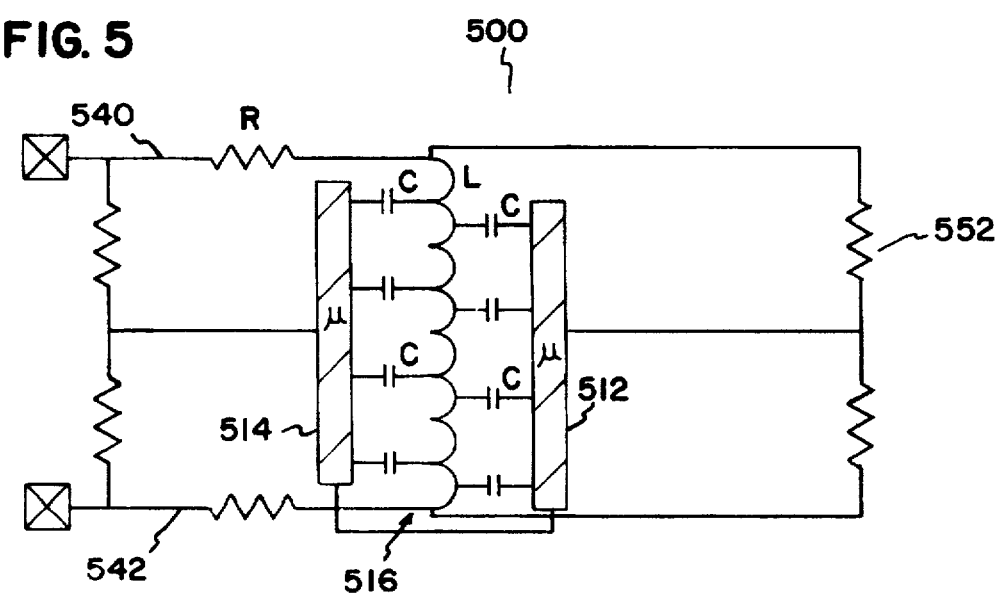

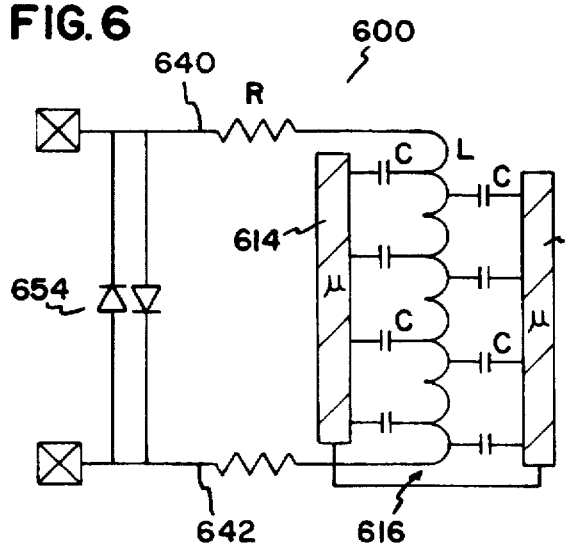
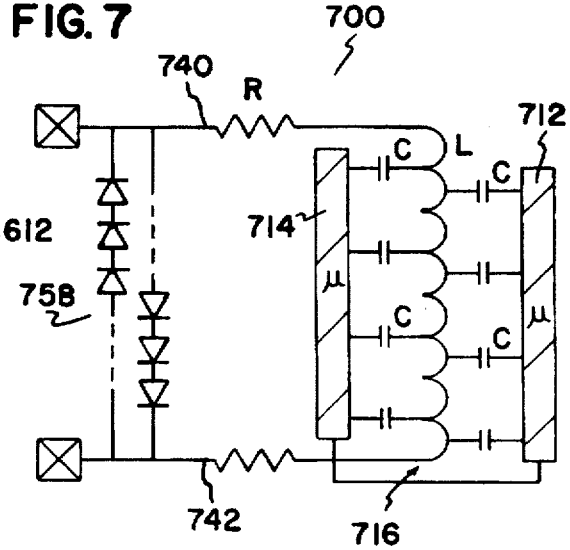
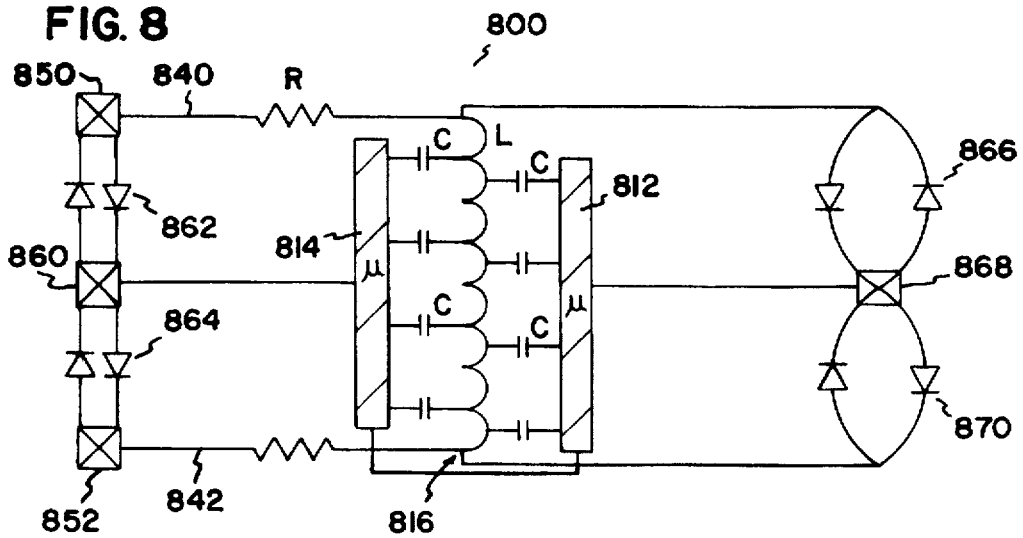
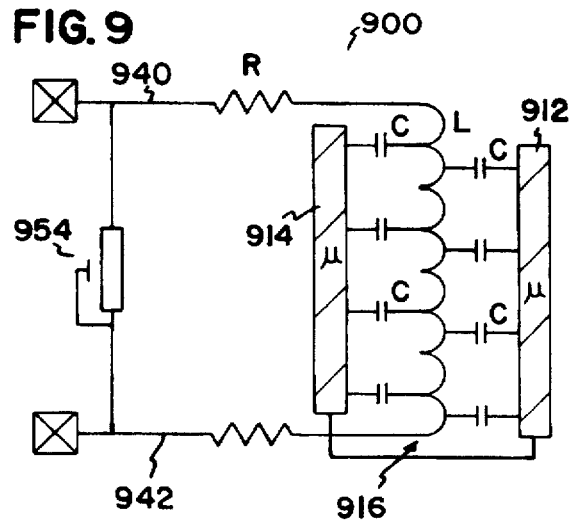
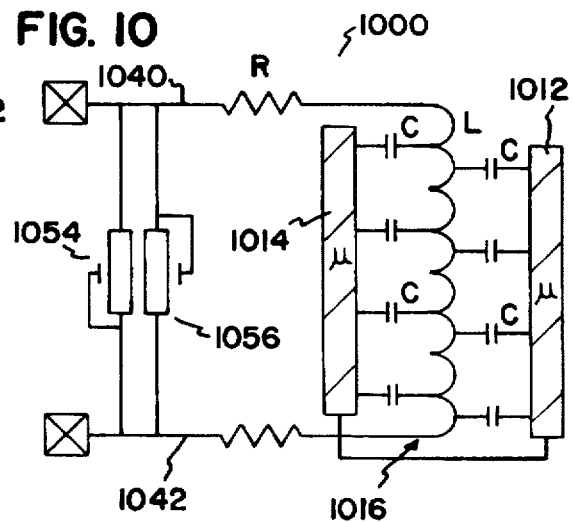

METHOD AND APPARATUS FOR PROVIDING ELECTROSTATIC DISCHARGE PROTECTION FOR AN INDUCTIVE COIL OF A MAGNETIC TRANSDUCER

BACKGROUND OF THE INVENTION

1. Field of the Invention

This invention relates in general to circuitry for the protection of electronic components from electrostatic discharge, and more particularly, to a method and apparatus for providing electrostatic discharge protection for an inductive coil in a magnetic head of a disk drive.

2. Description of Related Art

In current computer technology, the common mass storage devices are hard disk drives wherein data is stored on disks as magnetic patterns on a thin film of magnetic material on the surface of the disk. The data is recorded and read by the thin film magnetic transducer or "head."

Within the magnetic thin film transducer is a magnetic circuit comprising a thin film pole structure which is wrapped around or encircles the turns of a flat, spiraling wound coil. The thin film pole structure comprises spaced pole tips beyond the outer periphery of the coil, defining a magnetic gap therebetween. The transducer is positioned so that the pole tips scan a disk surface as the disk rotates. The coil is connected to an amplifier circuit which maintains the coil at a potential above the potential of the disk. The coil is insulated from the magnetic circuit with a photo-resist material which ideally is a high resistant insulator, but may have portions with poor insulating qualities due to imperfections, such as tiny holes in the photo-resist material or extraneous pieces of metal left on the photo-resist material during processing which capacitively couple the coil to the pole tips. There is therefore, often a charge present on the pole tips of the transducer.

According to current designs, the inductive coil film is approximately three microns by three microns in cross-section. As described above, a magnetic film is placed above and below the coil to guide the magnetic flux through a small gap for writing to the hard drive. The top film is the upper pole and the lower film is the lower pole forming the yoke around the inductive coil.

However, since there is no electrostatic discharge protection circuitry for the inductive coil, a charging of the inductive head caused, for example, by slider body contact with the disk, by human contact with the head, or by charging of the cables attached to the inductive coil may melt or vaporize the inductive coil as well as crack the insulating material surrounding the coil thereby allowing the metal leads connected to the coil to diffuse through the crack resulting in a short circuit of the coil. Furthermore, a major problem found during the manufacture of magnetic recording heads, particularly of the thin film type, is the buildup of static electricity produced by the presence of certain materials, such as plastics, which are present in the surroundings at the place of manufacture of the magnetic heads.

When there is a static discharge, between a magnetic pole piece and an adjacent conductive layer, the pole piece may be damaged, particularly at a critical sensing portion, such as the tip of the pole piece which is exposed and disposed adjacent to the transducing gap facing the recording medium. In addition, as mentioned above, the dielectric or insulating material that surrounds the magnetic head coil could break down from the discharge effect or the coil could be severely damaged or destroyed. As a result, the head assembly is subject to deterioration and degradation such that it may be rendered completely useless.

Approaches to alleviate this problem have involved the grounding of operators, tabletops, or the use of ion producing fans and air hose nozzle applications. Also, the materials used for storage containers and work trays must be carefully selected. However, the basic problem with static discharge at the critical portions of the magnetic head have not been completely solved by these approaches.

Furthermore, during operation, a slider floats over a magnetic recording medium as a result of the air flow created by relative motion of the medium as it rotates. The surface of the magnetic recording medium develops and accumulates static electricity (i.e., electric charges) due to the air flow. If the magnetic head upon starting or stopping, comes sufficiently close to or contacts the surface of the magnetic recording medium, a discharge may occur.

Many approaches have been used for protecting magnetic heads from electrostatic discharge (ESD) destruction. For example, U.S. Pat. No. 4,317,149, issued Feb. 23, 1992, to Elser et al., entitled "MAGNETIC HEAD HAVING STATIC DISCHARGE MEANS", and incorporate here in by reference, discloses a magnetic head assembly having conductive strips that serve as bypass paths to discharge static electrical charges at a distance from the magnetic pole pieces and transducing gap. Nevertheless, the bypass path merely carries the current away from the pole pieces and transducing gap and does not prevent the charges from building up on the critical elements.

As future inductive designs are scaled to submicron dimensions, the likelihood that an electrostatic discharge impulse will vaporize or melt the coil increases.

Therefore, it can be seen that there is a need for structures that provide electrostatic discharge protection of the inductive coil in a magnetic head.

It can also be seen that there is a need for structures which dissipate electrostatic charges which may arise between the leads of the inductive coil or between the inductive coil and one of the pole pieces in a magnetic head.

It can also be seen that there is a need to provide electrostatic discharge protection to magnetic heads which are scaled to submicron dimensions.

SUMMARY OF THE INVENTION

To overcome the limitations in the prior art described above, and to overcome other limitations that will become apparent upon reading and understanding the present specification, the present invention provides electrostatic discharge protection for an inductive coil in a magnetic head of a disk drive.

The present invention solves the above-described problems by providing structures which dissipate electrostatic charges which may arise between the leads of the inductive coil or between the inductive coil and one of the pole pieces in a magnetic head.

A system in accordance with the principles of the present invention includes an inductive coil having a first turn and a last turn and an electrostatic discharge element, coupled to the inductive coil, for dissipating electrostatic charge from the inductive coil. The electrostatic discharge element may be coupled across the first and last turn of the inductive coil and/or across one lead of the inductive coil and a magnetic pole piece.

One aspect of the present invention is the electrostatic discharge element may be a spark gap.

Another aspect of the present invention is that the electrostatic discharge element may be a diode or alternatively a diode string for greater charge thresholds.

Another aspect of the present invention is that the electrostatic discharge element may contain a silicon controlled rectifier or a field effect transistor.

Another aspect of the present invention is that the electrostatic discharge element may be a bleed transistor circuit.

Another aspect of the present invention is that the electrostatic discharge element may be a resistor bleed circuit.

Yet another aspect of the present invention is that the electrostatic discharge element may include a first electrostatic discharge element coupled between the first turn of the inductive coil and the magnetic yoke and a second electrostatic discharge element coupled between the magnetic yoke and the last turn of the inductive coil.

Another aspect of the present invention is that the magnetic yoke or pole piece may include an upper and a lower magnetic yoke.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout:

FIG. 2 illustrates the layout of the inductive coil for a magnetic head;

FIG. 5 illustrates an inductive head having a resistor protection circuit according to the present invention;

FIG. 6 illustrates an inductive head having a diode protection circuit according to the present invention;

FIG. 7 illustrates an inductive head having a diode string protection circuit according to the present invention;

FIG. 8 illustrates an inductive head having a back-to-back parallel diode protection circuit according to the present invention;

FIG. 9 illustrates an inductive head having a MOSFET protection circuit according to the present invention;

FIG. 10 illustrates an inductive head having a back-to-back, parallel MOSFET protection circuit according to the present invention;

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides electrostatic discharge protection for an inductive coil in a magnetic head of a disk drive. Structures according to the invention dissipate electrostatic charges which may arise between the leads of the inductive coil or between the inductive coil and one of the pole pieces in a magnetic head.

Figure 1:
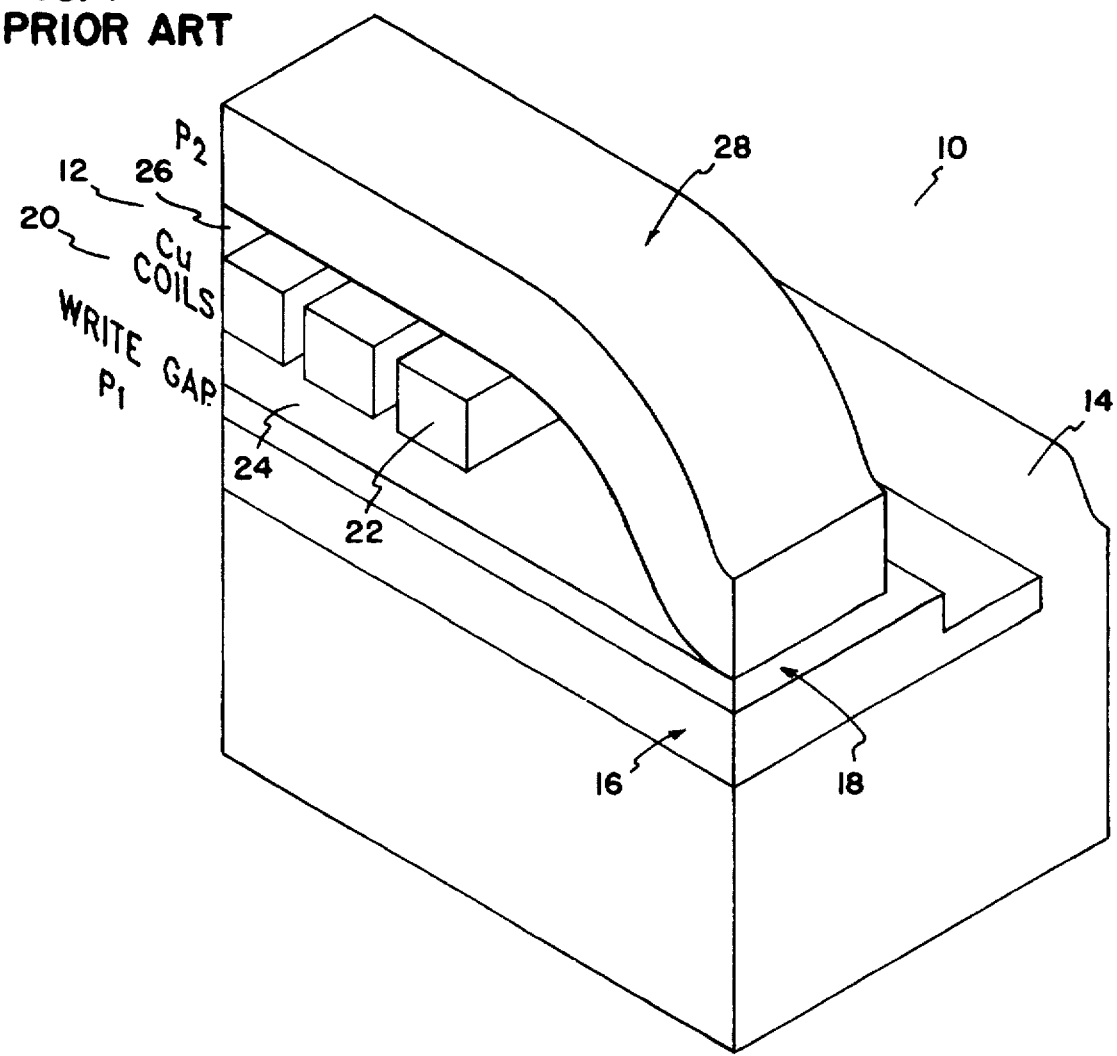
FIG. 1 is a cross-sectional view of a standard inductive head and slider body.

FIG. 1 illustrates a cross-sectional view 10 of a standard inductive head 12 and slider body 14. The entire inductive head 12 is formed by photolithographic deposition processes which allow its various elements to be formed with high accuracy and the very small dimensions necessary for superior operating characteristics.

The inductive head 12 includes a first pole piece 16 (i.e., bottom pole) that is deposited on the slider body 14. A flux gap 18 is formed by depositing a non-magnetic material, such as alumina, over the first pole piece. A multi-turn winding 20 having individual turns 22 lies above the first pole piece 16 and is insulated from it by an insulating layer 24. A second layer of insulation 26 is deposited on the winding 20 and the upper pole 28 is then deposited on this second insulation layer 26.

FIG. 2 illustrates the layout 200 of the inductive coil 220 for a magnetic head. The upper pole 228 and lower pole 216 are disposed above and below the coil 220. The upper pole 228 makes electrical and magnetic connection with the lower pole 216 so as to complete the magnetic circuit between them. The pole tips 230, 232 then define between them the flux gap 218.

The winding or coil 220 has a upper signal lead at the beginning of the first turn 240 at the innermost position. A lower signal lead 252 is connected to the end of the last, outermost turn 242 of the winding 220, and it is to those two signal leads on the first turn 240 and last turn 242 that the write signals are applied and from which the readback signals are received.

Figure 3:
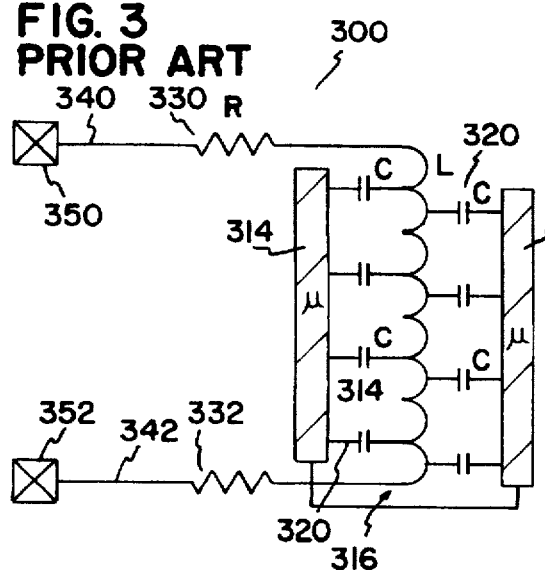
FIG. 3 illustrates the electrical model for a standard inductive head.

FIG. 3 illustrates the electrical model 300 for an inductive head. Again, upper 312 and lower 314 pole pieces surround an inductive coil 316. Electrical model 300 demonstrates that capacitance 320 exist between the coil 316 and the pole pieces 312, 314. The coil 316 inherently includes resistance as illustrated by resistors 330, 332. The leads of the first turn 340, and last turn 342 of the coil 316 terminate in connection pads 350, 352 respectively.

Figure 4:
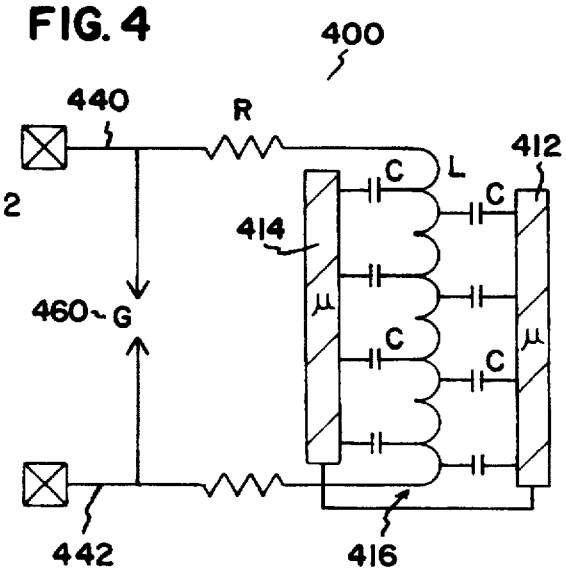
FIG. 4 illustrates an inductive head having a spark gap protection circuit according to the present invention.

FIG. 4 illustrates an inductive head 400 according to the present invention. A spark gap 460 is formed between the first turn 440 and the last turn 442 of coil 416. Spark gap 460 is designed to provide a bypass path around the inductive coil 416. Thus the spark gap provides a variable conductance element such that whenever a sufficient voltage is present on the first turn 440 and the last turn 442 of coil 416, a spark arcs across the gap and the excess electrostatic charge is dissipated. The dimensions of the spark gap are determined such that the voltage across the first turn 440 and the last turn 442 of coil 416 never rises to a level which would damages the coil 416.

FIG. 5 illustrates the electrical model 500 for another embodiment of electrostatic discharge protection for an inductive head according to the invention. In FIG. 5, a resistor circuit 554 is attached from the yoke to the first turn 540 and the last turn 542 of the inductive coil 516. The resistor circuit 554 is designed so that whenever a large electrostatic voltage level develops across the first turn 540 and the last turn 542 of the coil 516, current flows through the voltage divider by a circuit 554 to bleed the current away from the pole 514. A mirrored voltage divider by a circuit 552 may be implemented for pole 512. The resistor circuits 552, 554 have resistance values which are much greater than the resistance of the inductive coil 516. Thus, the resistance for the resistor circuits 552,554 are chosen so that the performance of the inductive coil 516 is not effected.

FIG. 6 illustrates a diode electrostatic protection circuit 600 according to the present invention. The diode protection circuit of the invention connects the first 640 and last 642 turns of the coil 616. Thus the diodes 654 provide a low conduction path for the fast discharging of electrostatic charge buildup. The diodes 654 provide the electrical separation necessary to provide proper local isolation between the first 640 and last 642 turn of coil 616 so that normal operation of the head is maintained. The diodes 654 are arranged in a back-to-back, parallel fashion to accommodate both positive and negative potentials across the first 640 and last 642 turn of the coil 616. When electrostatic discharge occurs across the first 640 and last 642 turn of the coil 616, the charge is dissipated across the diodes 654 when the potential of the electrostatic charge rises above (in an absolute sense) the threshold voltage (typically 0.7 volts) on either of the back-to-back diodes.

FIG. 7 illustrates an alternative embodiment of a diode protection circuit 700 wherein a string of diodes 758 is connected across the first 740 and last 742 turn of coil 716. Accordingly, the string of diodes 758 accommodates a greater threshold voltage electrostatic charge.

FIG. 8 illustrates another alternative embodiment of a diode protection circuit 800 according to the present invention. In FIG. 8, a set of back-to-back parallel diodes 862, 866 are coupled between the first turn 840 of the magnetic coil 816 and the magnetic yokes 814, 812 at nodes 860, 868 respectively. Similarly, back-to-back parallel diodes 864, 870 are coupled between the magnetic yokes 814, 812 at nodes 860, 868 and the last turn 842 of the inductive coil 816. The diodes 862, 864, 866, 870 dissipate the buildup of electrostatic charge between the inductive coil and the magnetic yoke.

FIG. 9 illustrates a MOSFET protection circuit 900 according to the present invention. In FIG. 9, an N-type MOSFET 954 is disposed between the first 940 and last 942 turn of the coil 916. The gate of the MOSFET 954 is tied to the ground rail, i.e., the last turn or lower lead 942 of the coil 916.

Alternatively, or in combination as illustrated with the MOSFET protection circuit 1000 in FIG. 10, a P-type MOSFET transistor 1056 may be disposed in parallel to the N-type MOSFET transistor 1054 across the first 1040 and last 1042 turn of the coil 1016.

Figure 11:
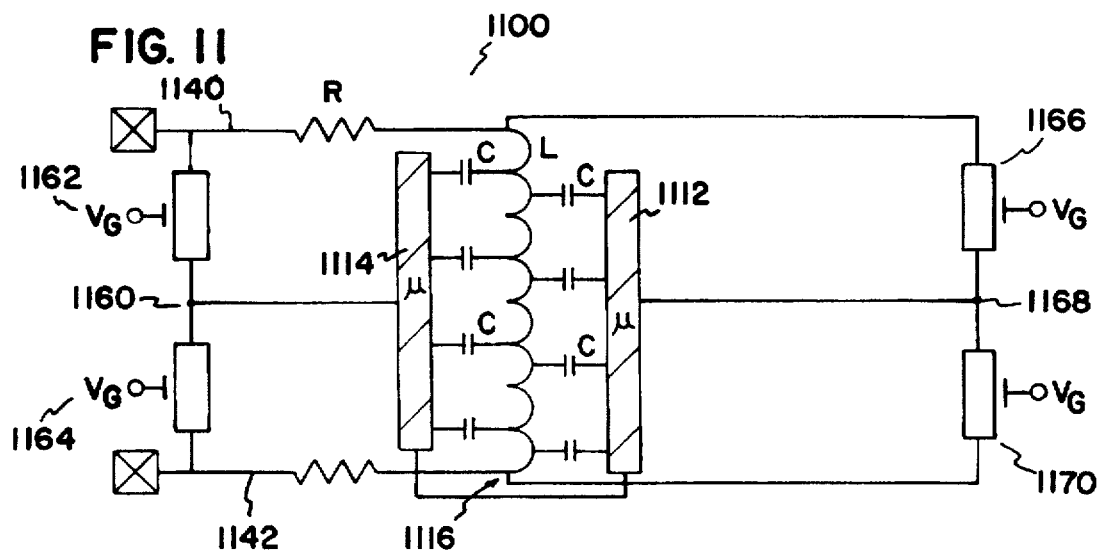
FIG. 11 illustrates an inductive head having a MOSFET transistor discharge bleed protection circuit according to the present invention.

FIG. 11 illustrates another alternative embodiment of a MOSFET protection circuit 1100 according to the present invention. In FIG. 11, bleed transistors 1162, 1166 are coupled between the first turn 1140 of the magnetic coil 1116 and the magnetic yokes 1114, 1112 respectively. Similarly, bleed transistors 1164, 1170 are coupled between the nodes 1160, 1168 and the last turn 1142 of the inductive coil 1116.

The bleed transistors 1162, 1164, 1166, 1170 bleed the electrostatic charge between the inductive coil and the magnetic yokes. However, the bleed transistors 1162, 1164, 1166, 1170 do not draw much current under normal operation of the inductive coil 1116 since they appear as a high effective resistance. This results from the channel width to length ratio being on the order of 1:100. Nevertheless, in the presence of a sufficient electrostatic charge, the bleed transistors 1162, 1164, 1166, 1170 will dissipate the charge thereby protecting the inductive coil 1116.

Figure 12:
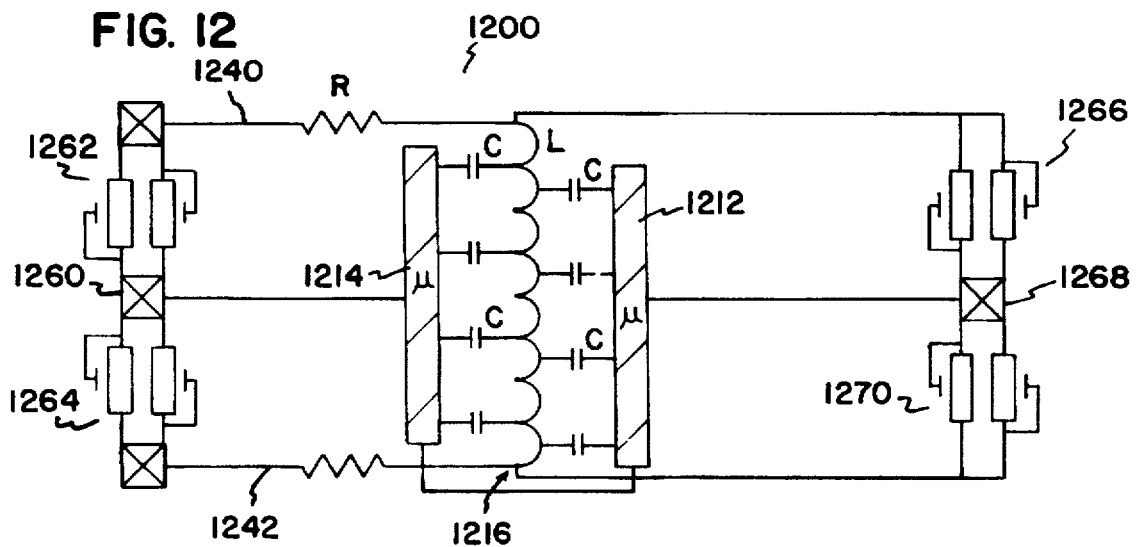
FIG. 12 illustrates an inductive head having coil-to-yoke, back-to-back, parallel MOSFET transistor protection circuit according to the present invention.

FIG. 12 illustrates another alternative embodiment of a MOSFET protection circuit 1200 according to the present invention. In FIG. 12, a first N-type MOSFET transistor, P-type MOSFET transistor pair 1262 is disposed between the first turn 1240 of the inductive coil 1216 and the pad 1260 for the lower pole 1214. The gate of the N-type MOSFET of MOSFET transistor pair 1262 is tied to the pad 1260 for the lower pole 1214 and the gate for the P-type MOSFET transistor of MOSFET transistor pair 1262 is tied to the first turn 1240 of the inductive coil 1216.

Similarly, a second N-type MOSFET transistor, P-type MOSFET transistor pair 1264 is disposed between the last turn 1242 of the inductive coil 1216 and the pad 1260 for the lower pole 1214. The gate of the N-type MOSFET of MOSFET transistor pair 1264 is tied to the last turn 1242 of the inductive coil and the gate for the P-type MOSFET of MOSFET transistor pair 1264 is tied to the pad 1260 for the lower pole 1214.

In addition, a third N-type MOSFET transistor, P-type MOSFET transistor pair 1266 is disposed between the first turn 1240 of the inductive coil 1216 and the pad 1268 for the upper pole 1212. The gate of the N-type MOSFET of MOSFET transistor pair 1266 is tied to the pad 1268 for the upper pole 1212 and the gate for the P-type MOSFET of MOSFET transistor pair 1266 is tied to the first turn 1240 of the inductive coil 1216.

Similarly, a fourth N-type MOSFET transistor, P-type MOSFET transistor pair 1270 is disposed between the last turn 1242 of the inductive coil 1216 and the pad 1268 for the upper pole 1212. The gate of the N-type MOSFET of MOSFET transistor pair 1270 is tied to the last turn 1242 of the inductive coil 1216 and the gate for the P-type MOSFET of MOSFET transistor pair 1270 is tied to the pad 1268 for the upper pole 1212.

Figure 13:
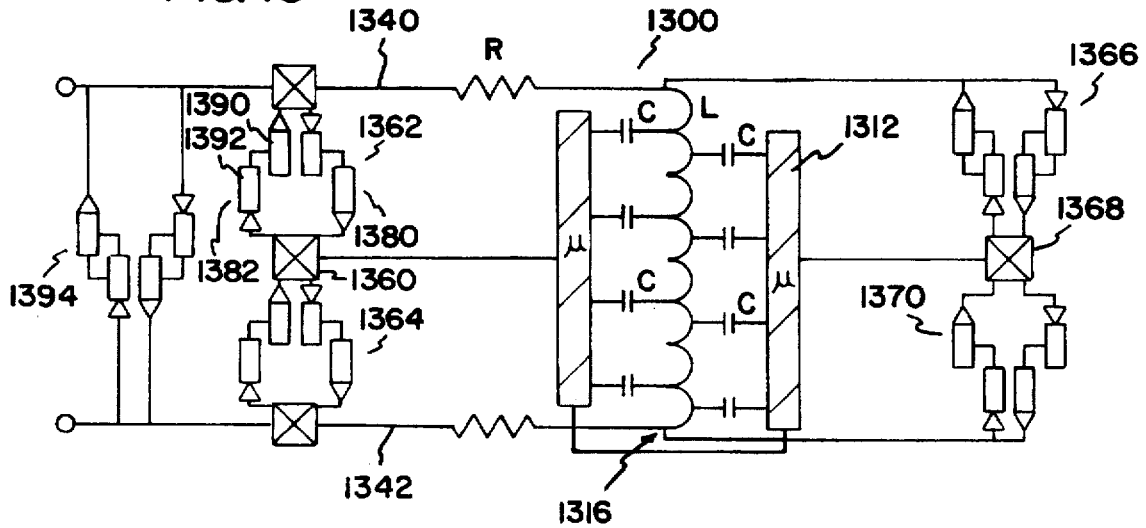
FIG. 13 illustrates an inductive head having a pnpn silicon controlled rectifier (SCR) protection circuit according to the present invention.

FIG. 13 illustrates an embodiment of a silicon controlled rectifier (SCR) protection circuit 1300 according to the present invention. In FIG. 13, a pnpn silicon controlled rectifier pair 1362 is disposed between the first turn 1340 of the inductive coil 1316 and the pad 1360 for the lower pole 1314. Each silicon controlled rectifier 1380, 1382 includes a pnp transistor 1390 and an npn transistor 1392. The transistors 1390, 1392 are selected so that the forward blocking voltage does not exceed the electrostatic discharge capacity of the coil 1316. A pair of silicon controlled rectifiers are used to protect the coil 1316 regardless of the polarity of the charge. Thus, when an electrostatic charge greater than the blocking voltage occurs across the first turn 1340 of the inductive coil 1316 and the pad 1360 for the lower pole 1314, the transistors 1390, 1392 turn to discharge the electrostatic charge.

Similarly, a second pnpn silicon controlled rectifier pair 1364 is disposed between the last turn 1342 of the inductive coil 1316 and the pad 1360 for the lower pole 1314. Thus, when an electrostatic charge greater than the blocking voltage occurs across the last turn 1342 of the inductive coil 1316 and the pad 1360 for the lower pole 1314, the silicon controlled rectifier pair 1364 discharges the electrostatic charge. A third 1366 and fourth 1370 silicon controlled rectifier pair are disposed between the first turn 1340 of the coil 1316 and pad 1368 for the upper pole 1312, and the last turn 1342 of the coil 1316 and pad 1368 respectively. Those skilled in the art will recognize that a fifth silicon rectifier pair 1394 may be disposed between the first 1340 and last 1342 turn of the coil 1316 to discharge electrostatic charges which may develop across the first 1340 and last 1342 turn of the coil 1316.

Figure 14:
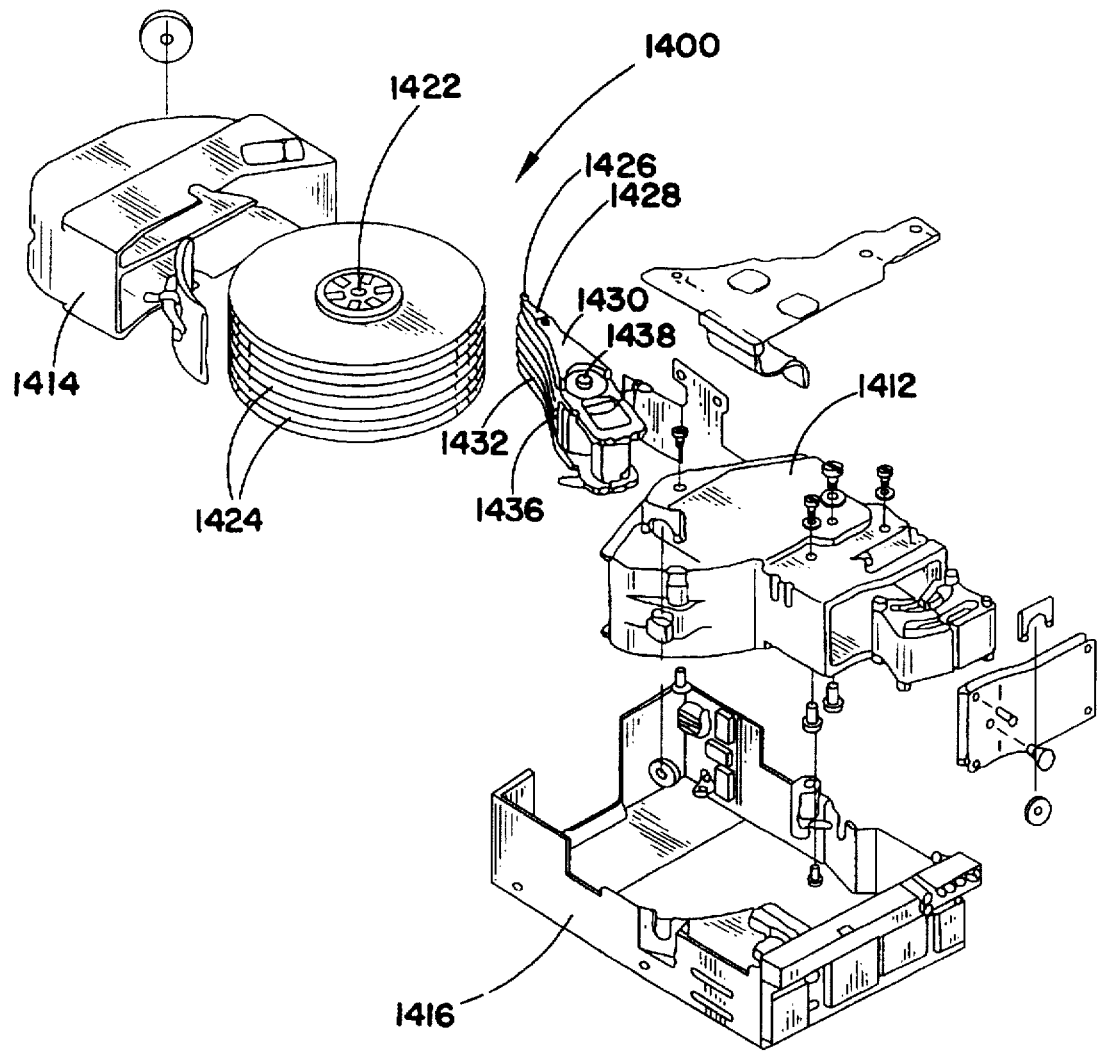
FIG. 14 is an exploded view of a disk drive operable in accordance with the invention.

Finally, FIG. 14 illustrates an exploded view of a disk drive 1400. The disk drive 1400 includes a housing 1412 and a housing cover 1414 which, after assembly, is mounted within a frame 1416. Mounted within the housing is a spindle shaft 1422. Rotatably attached to the spindle shaft 1422 are a number of disks 1424. In FIG. 14, eight disks 1424 are attached to the spindle shaft 1422 in spaced apart relation. The disks 1424 rotate on spindle shaft 1422 which is powered by a motor (not shown). Information is written on or read from the disks 1424 by heads or magnetic transducers (not shown) which are supported by sliders 1426. Preferably, sliders having magnetic transducers in accordance with the invention are coupled to the suspensions or load springs 1428. The load springs 1428 are attached to separate arms 1430 on an E block or comb 1432. The E block or comb 1432 is attached at one end of an actuator arm assembly 1436. The actuator arm assembly 1436 is rotatably attached within the housing 1412 on an actuator shaft 1438. However, the invention is not meant to be limited to the disk drive described above.

Those skilled in the art will recognize that the above-described protection circuits may be fabricated using a variety of materials. For example, the MOSFET transistors may be silicon, silicon on insulator (SOI), or poly thin film transistors. In the case of SOI devices, MOSFET SOI transistors can have its body connected to the inductive head pad (body coupled) or left floating.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A inductive head assembly, comprising:
   an inductive coil having a first turn and a last turn; and
   an electrostatic discharge element, electrically coupled to the inductive coil, for dissipating electrostatic charge from the inductive coil, the electrostatic discharge element being electrically coupled across the first and last turns of the inductive coil.

2. The inductive head assembly of claim 1 wherein the electrostatic discharge element comprises a first and a second bleed transistor circuit, the first bleed transistor circuit comprising an n-type FET transistor and the second bleed transistor circuit comprising a p-type FET transistor, the gate of the n-type FET transistor being connected to the last turn of the inductive coil and the gate of the p-type FET transistor being coupled to the first turn of the inductive coil, the first and second bleed transistor circuits being positioned back-to-back and in parallel across the first and last turns of the inductive coil.

3. The inductive head assembly of claim 1 wherein the electrostatic discharge element comprises a spark gap.

4. The inductive head assembly of claim 1 wherein the electrostatic discharge element comprises a diode.

5. The disk drive apparatus of claim 1 wherein the electrostatic discharge element comprises a MOSFET transistor.

6. The disk drive apparatus of claim 1 wherein the electrostatic discharge element comprises a silicon controlled rectifier.

7. The inductive head assembly of claim 1 wherein the electrostatic discharge element comprises a first and a second diode, the first and second diodes being positioned back-to-back and in parallel across the first and last turns of the inductive coil.

8. The inductive head assembly of claim 1 wherein the electrostatic discharge element comprises a first and a second diode string, the first and second diode strings being positioned back-to-back and in parallel across the first and last turns of the inductive coil.

9. The inductive head assembly of claim 1 wherein the electrostatic discharge element comprises a bleed transistor circuit.

10. The inductive head assembly of claim 1 further comprising a magnetic yoke and wherein the electrostatic discharge element comprises a first electrostatic discharge element electrically coupled between the first turn of the inductive coil and the magnetic yoke and a second electrostatic discharge element coupled between the magnetic yoke and the last turn of the inductive coil.

11. The inductive head assembly of claim 10 wherein the magnetic yoke comprises an upper and a lower magnetic pole.

12. The inductive head assembly of claim 10 wherein the magnetic yoke comprises an upper and a lower magnetic pole, and wherein the first electrostatic discharge element comprises a first upper electrostatic discharge element electrically coupled between the first turn of the inductive coil and the upper magnetic pole, a second upper electrostatic discharge element electrically coupled between the upper magnetic pole and the last turn of the inductive coil, a first lower electrostatic discharge element electrically coupled between the first turn of the inductive coil and the lower magnetic pole, and a second lower electrostatic discharge element electrically coupled between the lower magnetic pole and the last turn of the inductive coil.

13. The inductive head assembly of claim 12 wherein the first upper, second upper, first lower, and second lower electrostatic discharge element comprises a first and a second diode, the first and second diodes being positioned back-to-back and in parallel.

14. The inductive head assembly of claim 12 wherein the first upper, second upper, first lower, and second lower electrostatic discharge element comprises a resistor.

15. The inductive head assembly of claim 12 wherein the first upper, second upper, first lower, and second lower electrostatic discharge element comprises a bleed transistor circuit.

16. The inductive head assembly of claim 12 wherein the first upper, second upper, first lower, and second lower electrostatic discharge element comprises a first and a second bleed transistor circuit, the first bleed transistor circuit comprising an n-type FET transistor and the second bleed transistor circuit comprising a p-type FET transistor, the first and second bleed transistor circuits being positioned back-to-back and in parallel.

17. A disk drive apparatus for recording data, comprising:
   a housing;
   a disk, disposed within the housing, for recording data thereon;

an actuator arm assembly;

a slider, attached to the actuator arm assembly proximate to the disk such that the slider can be selectively positioned over the surface of the disk; and a head assembly, coupled to the slider, the head assembly comprising:

an inductive coil having a first turn and a last turn; and an electrostatic discharge element, electrically coupled to the inductive coil, for dissipating electrostatic charge from the inductive coil, the electrostatic discharge element being electrically coupled across the first and last turns of the inductive coil.

18. The disk drive apparatus of claim 17 wherein the electrostatic discharge element comprises a spark gap.

19. The disk drive apparatus of claim 17 wherein the electrostatic discharge element comprises a diode.

20. The disk drive apparatus of claim 17 wherein the electrostatic discharge element comprises a MOSFET transistor.

21. The disk drive apparatus of claim 17 wherein the electrostatic discharge element comprises a silicon controlled rectifier.

22. The disk drive apparatus of claim 17 wherein the electrostatic discharge element comprises a first and a second diode, the first and second diodes being positioned back-to-back and in parallel across the first and last turns of the inductive coil.

23. The disk drive apparatus of claim 17 wherein the electrostatic discharge element comprises a first and a second diode string, the first and second diode strings being positioned back-to-back and in parallel across the first and last turns of the inductive coil.

24. The disk drive apparatus of claim 17 wherein the electrostatic discharge element comprises a bleed transistor circuit.

25. The disk drive apparatus of claim 17 wherein the electrostatic discharge element comprises a first and a second bleed transistor circuit, the first bleed transistor circuit comprising an n-type FET transistor and the second bleed transistor circuit comprising a p-type FET transistor, the gate of the n-type FET transistor being connected to the last turn of the inductive coil and the gate of the p-type FET transistor being coupled to the first turn of the inductive coil, the first and second bleed transistor circuits being positioned back-to-back and in parallel across the first and last turns of the inductive coil.

26. The disk drive apparatus of claim 17 further comprising a magnetic yoke, the magnetic yoke comprising an upper and a lower magnetic pole.

27. The disk drive apparatus of claim 26 wherein the electrostatic discharge element comprises a first electrostatic discharge element electrically coupled between the first turn of the inductive coil and the magnetic yoke and a second electrostatic discharge element electrically coupled between the magnetic yoke and the last turn of the inductive coil.

28. The disk drive apparatus of claim 26 wherein the electrostatic discharge element comprises a first upper electrostatic discharge element electrically coupled between the first turn of the inductive coil and the upper magnetic pole, a second upper electrostatic discharge element electrically coupled between the upper magnetic pole and the last turn of the inductive coil, a first lower electrostatic discharge element electrically coupled between the first turn of the inductive coil and the lower magnetic pole, and a second lower electrostatic discharge element electrically coupled between the lower magnetic pole and the last turn of the inductive coil.

29. The disk drive apparatus of claim 28 wherein the first upper, second upper, first lower, and second lower electrostatic discharge element comprises a first and a second diode, the first and second diodes being positioned back-to-back and in parallel.

30. The disk drive apparatus of claim 28 wherein the first upper, second upper, first lower, and second lower electrostatic discharge element comprises a resistor.

31. The disk drive apparatus of claim 28 wherein the first upper, second upper, first lower, and second lower electrostatic discharge element comprises a bleed transistor circuit.

32. The disk drive apparatus of claim 28 wherein the first upper, second upper, first lower, and second lower electrostatic discharge element comprises a first and a second bleed transistor circuit, the first bleed transistor circuit comprising an n-type FET transistor and the second bleed transistor circuit comprising a p-type FET transistor, the first and second bleed transistor circuits being positioned back-to-back and in parallel.

33. A method of protecting an inductive head from electrostatic discharge, comprising the steps of:

forming an inductive coil having a first turn and a last turn; and electrically coupling an electrostatic discharge element to the inductive coil for dissipating electrostatic charge from the inductive coil, the electrostatic discharge element being electrically coupled across the first and last turns of the inductive coil.

34. The method of claim 33 further comprising the step of creating a magnetic yoke and wherein the step of coupling the electrostatic discharge element to the inductive coil further comprises the step of electrically coupling the electrostatic discharge element between the first turn of the inductive coil and the magnetic yoke and between the magnetic yoke and the last turn of the inductive coil.

35. The method of claim 34 wherein the magnetic yoke comprises an upper and a lower magnetic pole.

* * * * *